(12) United States Patent
Manuel-Devadoss

(10) Patent No.: US 8,548,814 B2
(45) Date of Patent: Oct. 1, 2013

(54) METHOD AND PORTABLE SYSTEM FOR PHONETIC LANGUAGE TRANSLATION USING BRAIN INTERFACE

(75) Inventor: Johnson Manuel-Devadoss, Chennai (IN)

(73) Assignee: Johnson Manuel-Devadoss, Pearland, TX (US)

( * ) Notice: Subject to any disclaimer, the term of this patent is extended or adjusted under 35 U.S.C. 154(b) by 1000 days.

(21) Appl. No.: 12/590,308

(22) Filed: Nov. 5, 2009

(65) Prior Publication Data

US 2010/0057436 A1  Mar. 4, 2010

(51) Int. Cl.
*G10L 21/00* (2013.01)

(52) U.S. Cl.
USPC .......................................................... 704/277

(58) Field of Classification Search
USPC .......................................... 704/2, 3, 259, 277
See application file for complete search history.

(56) References Cited

U.S. PATENT DOCUMENTS

| 7,901,211 B2 * | 3/2011 | Pennebaker | 434/167 |
| 2006/0111890 A1 * | 5/2006 | Mowatt et al. | 704/3 |
| 2011/0159467 A1 * | 6/2011 | Peot et al. | 434/157 |

* cited by examiner

*Primary Examiner* — Abul Azad

(57) ABSTRACT

A phonetic language translation system receives audio output from an audible program presented to the user, so as to identify any speech signal contained within the audio output. The speech signals are broken down into recognizable phonemes which make up the most basic elements of speech in spoken languages. The sequentially generated phonemes are then regrouped to form recognizable words in one of native languages spoken around the world. While watching the audible program, the activity of language area of user's brain is recorded using electrodes in the cap. The recorded language area brain signals are analyzed and compared with brain language area activity knowledge base to identify the native language of user. Sentences are formed using the grammatical rules of the native language. Each sentence is then translated into the identified native language and broadcast to the user using a voice synthesizer.

8 Claims, 6 Drawing Sheets

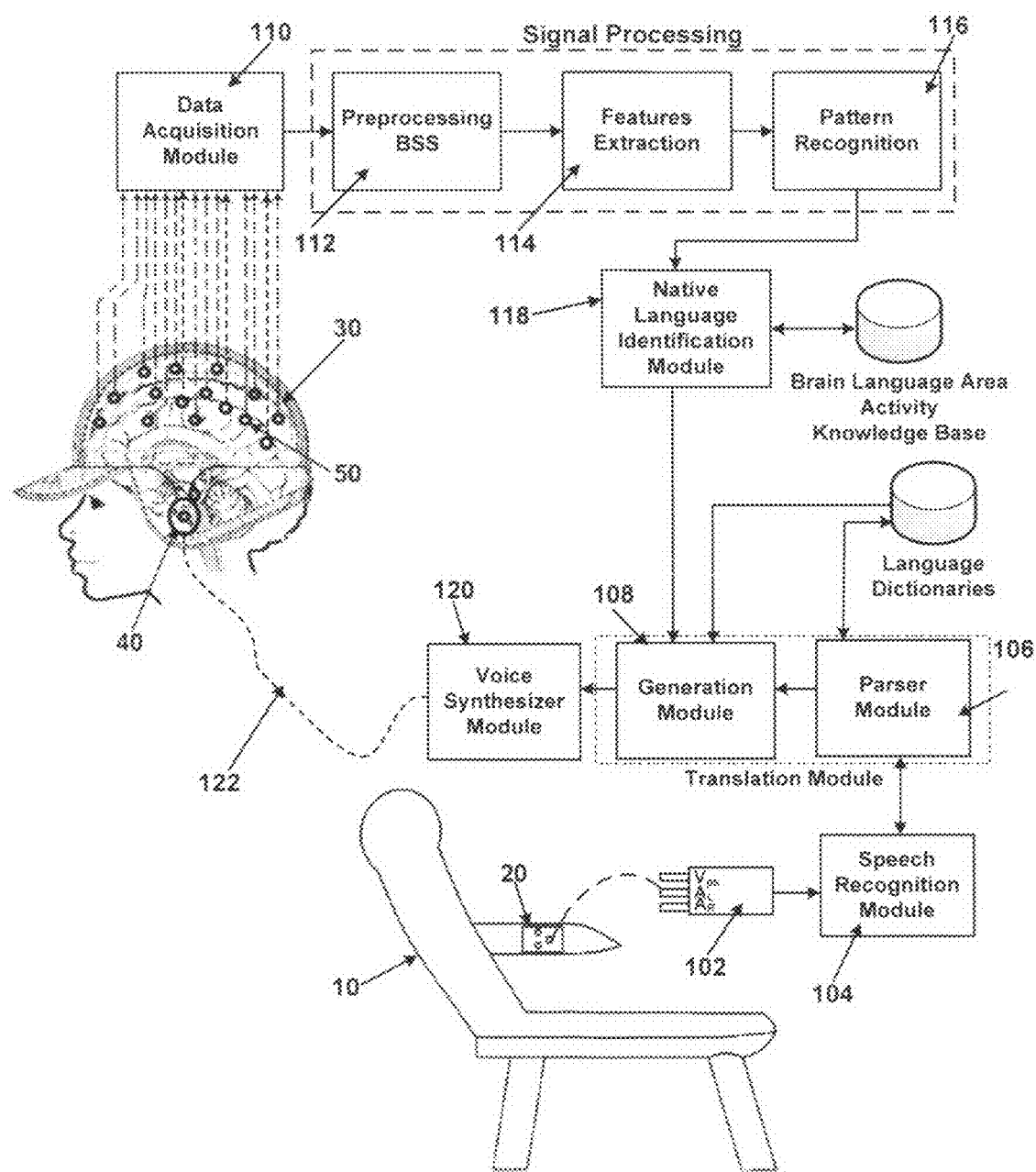
FIG. 1.a – PRIOR ART

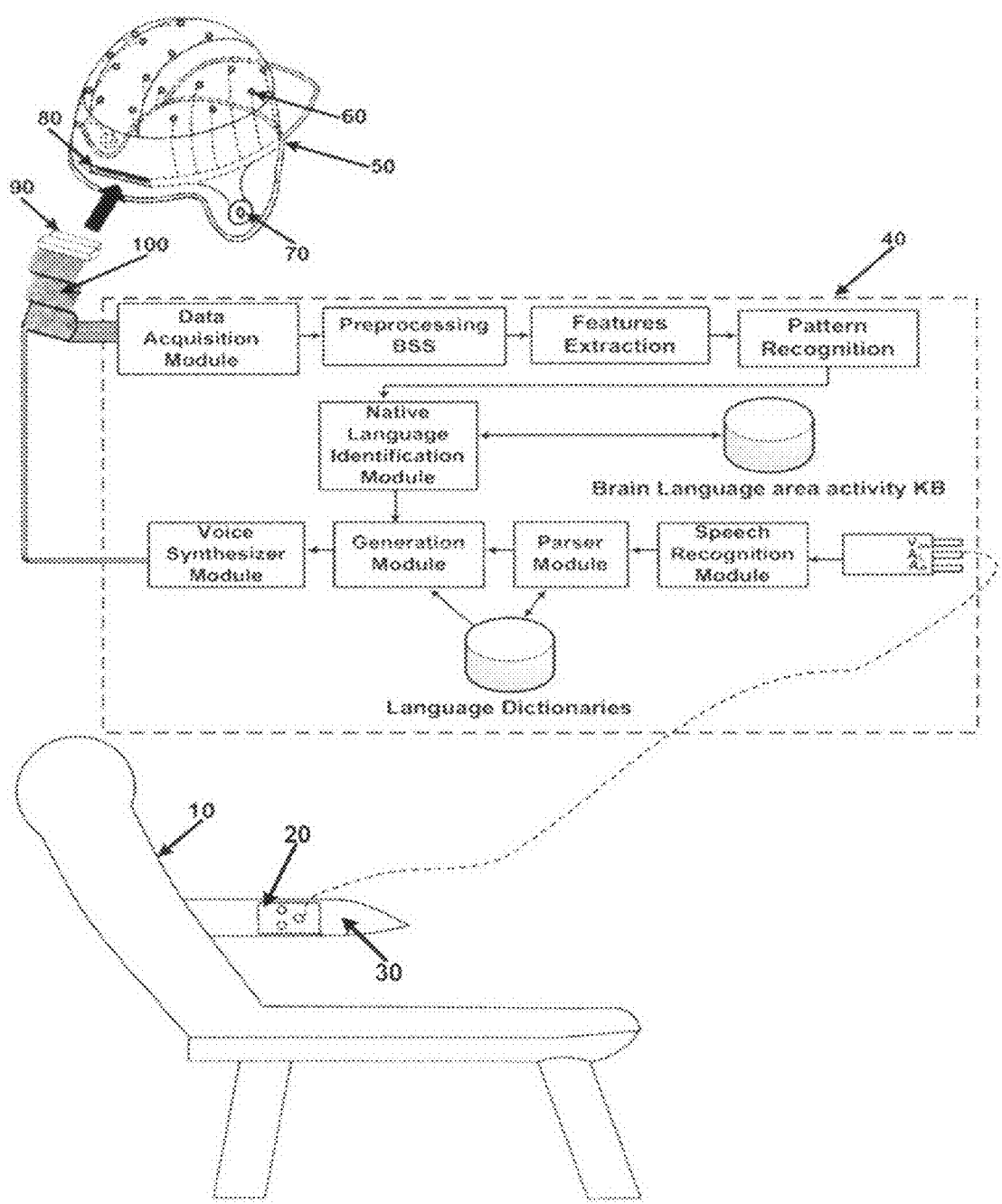
FIG. 1.b

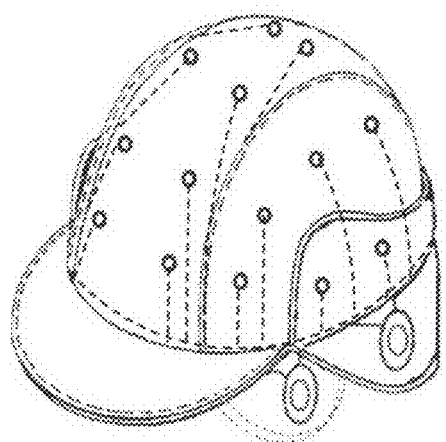
FIG. 5.a
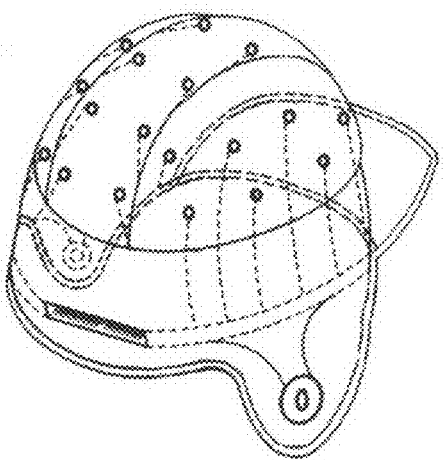
FIG. 5.b
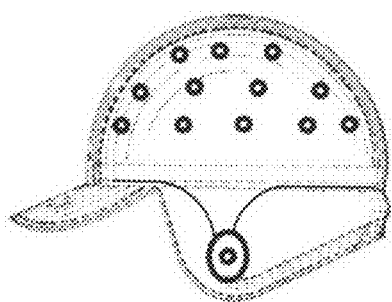
FIG. 5.c
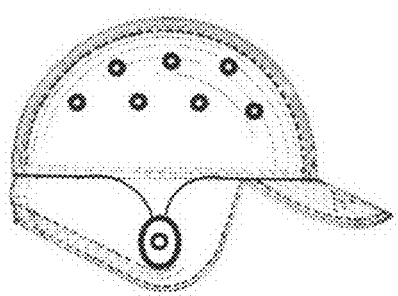
FIG. 5.d

METHOD AND PORTABLE SYSTEM FOR PHONETIC LANGUAGE TRANSLATION USING BRAIN INTERFACE

FIELD OF THE INVENTION

The present invention relates generally to a language translation system, and more particularly, to a Phonetic Language Translation System capable of translating any speech within the audio output of the audible program to the native language of user who is listening to the audible program. The present invention performs translation of the spoken words from the audio output of the audible program to a language the users' brain language area can comprehend.

BACKGROUND OF THE INVENTION

In recent days, people prefer to hear event/programs in their native language either while watching the public events like indoor area for housing dramatic presentations, stage entertainments, surgical demonstrations or motion-picture. People always look for translators or subtitles in events and programs to comprehend the foreign language. There is a need for a system to translate audio output of any audible program to a user's native language in a fast, easy, reliable and cost effective manner. Also, there is a need for a phonetic language translation system that may substitute interpreters and subtitles.

A number of hand-held language translators are available in the market, capable of translating an audible speech only to a specific set of languages. This predetermined set is a combination of popular languages spoken in the world. But, there are more than 6,700 native languages being used in the world. People are forced to buy multiple language translators to cover a broader range of language translation. There is not a single system capable of performing audible speech translation from any of the 6,700 native languages to any of the other languages spoken in the world.

In today's language translators, the user always has a need to select their native languages as target language. If translators are unavailable for their native languages they have to settle for a translator that has the closet language they are familiar with as target language. But in settling for secondary target language translators there is a possibility that users may experience loss in understanding some of the translations. This can happen because of cross cultural differences.

U.S. patent application Ser. No. 12/543,054, filed Aug. 18, 2009, and U.S. patent application Ser. No. 12/563,123, filed Sep. 19, 2009, assigned to the same assignee as the instant application, incorporated herein by reference.

The following U.S. patents are hereby incorporated by reference for their teaching of language translation systems and methods: U.S. Pat. No. 6,356,865, issued to Franz et al., entitled "Method and system for performing spoken language translation"; U.S. Pat. No. 5,758,023, issued to Bordeaux, entitled "Multi-language speech recognition system"; U.S. Pat. No. 5,293,584, issued to Brown et al., entitled "Speech recognition system for natural language translation"; U.S. Pat. No. 5,963,892, issued to Tanaka et al., entitled "Translation apparatus and method for facilitating speech input operation and obtaining correct translation thereof"; U.S. Pat. No. 7,162,412, issued to Yamada et al., entitled "Multilingual conversation assist system"; U.S. Pat. No. 6,917,920, issued to Koizumi et al., entitled "Speech translation device and computer readable medium"; U.S. Pat. No. 4,984,177/issued to Rondel et al., entitled "Voice language translators; and U.S. Pat. No. 4,507,750, issued to Frantz et al., entitled "Electronic apparatus from a host language".

According to U.S. Pat. No. 5,615,301 issued to Rivers et al., entitled "Automated Language Translation System", each sentence is translated into a universal language and then the sentences are translated from universal language to the preferred language of the user as identified by the user. Such a system disclosed in U.S. Pat. No. 5,615,301, is capable of translating an audible speech only to a specific set of native languages. This predetermined set is a combination of popular native languages spoken in the world. But, there are more than 6,700 native languages being used in the world. Such a system disclosed in U.S. Pat. No. 5,615,301 is not capable of performing language translation for audio speech in any of the 6,700 native languages to any of the other languages spoken in the world.

Although there have been many advances in system and software for providing phonetic language translation for users who are interested to hear an audible program in a language other than their native language; there has not been an system or method that facilitate to identify user's native language using language area of brain of user and use the identified native language for translation. Accordingly, the present inventor has developed a system that can identify the native language of user by his/her brain language area as target language for audio speech translation.

SUMMARY OF THE INVENTION

In view of the foregoing disadvantages inherent in the prior art, the general purpose of the present invention is to provide a native language translation system configured to include all the advantages of the prior art, and to overcome the drawbacks inherent therein.

The present invention translates the spoken dialog in audio output to user's native language. In other words, the present invention performs language translation of the audible program presented to the user; to a language that is directly comprehended by the language area of the listener's brain. Thus, audience enjoys the audible program without having language books, interpreters, or closely reading the subtitles.

The present invention allows a user to hear a program in his or her native language either while watching the audible program which is presented in a foreign language. The present invention includes a speech recognition module to recognize phonemes of speech from the audio program. These phonemes are then combined in word groups to form recognizable words in one of the native languages spoken in the world. The user's brain language area activity is recorded by using electrodes in the cap. The recorded brain language area activity signals are then analyzed and compared with brain language area activity knowledge base. If the characteristics of received brain language area activity signal are identical to any one of the entry present in the brain language area activity knowledge base the present invention selects the equivalent native language information from the entry and then the selected native language is used as target language for language translation. Further the present invention automatically translates the speech in audible program into an audible speech of user's native language and then each translated sentence is broadcast with a voice synthesizer to the user.

Accordingly, it is a principal object of the present invention to provide a language translation, to translate the audio of an audible program into a native language of the user.

It is another object of the present invention to identify the native language of the user without selecting any language preference. The present invention uses the brain language area activity signals to identify the native language of the user. The brain language area activity signals are acquired using the electrodes which are presented in the cap and then these signals are compared with brain language area activity knowledge base to determine the native language of the user.

It is an object of the present invention to provide improved elements and arrangements thereof in a system for the purposes described which is inexpensive, dependable and fully effective in accomplishing its intended purposes.

In another aspect, the present invention provides a phonetic language translation system for use as a portable apparatus, thereby making the phonetic language translation system handy and comfortable to use.

These and other objects of the present invention will become readily apparent upon further review of the following specification and drawings.

Therefore, an object of the present invention is to provide the phonetic language translation system that is capable of providing a translation of audio output of an audible program from one language to a native language of user which his/her brain language area can comprehend, thereby user does not need to select the target language but is able to listen to the audible speech of foreign language program without using language translator books or closely reading the subtitles of foreign language program.

These together with other aspects of the present invention, along with the various features of novelty that characterize the present invention, are pointed out with particularity in the claims annexed hereto and form a part of the present invention. For a better understanding of the present invention, its operating advantages, and the specific objects attained by its uses, reference should be made to the accompanying drawings and descriptive matter in which there are illustrated exemplary embodiments of the present invention.

BRIEF DESCRIPTION OF THE DRAWINGS

FIG. 1.a depicts a block diagram of an exemplary system for providing the phonetic language translation using Brain Interface according to an embodiment of the present disclosure.

FIG. 1.b depicts a block diagram of an exemplary portable system for phonetic language translation using brain Interface according to an exeplary embodiment of the present disclosure.

FIG. 5 is the elevations of cap, comprising:
FIG. 5.a is a front-side elevation of the cap;
FIG. 5.b is a back-side elevation of the cap;
FIG. 5.c is a left-side elevation of the cap;
FIG. 5.d is a right-side elevation of the cap.

DETAILED DESCRIPTION

The exemplary embodiments described herein detail for illustrative purposes and are subject to many variations in structure and design. It should be emphasized, however, that the present invention is not limited to a phonetic language translation system, as shown and described. It is understood that various omissions and substitutions of equivalents are contemplated as circumstances may suggest or render expedient, but these are intended to cover the application or implementation without departing from the spirit or scope of the claims of the present invention. Also, it is to be understood that the phraseology and terminology used herein is for the purpose of description and should not be regarded as limiting.

Figure 2:
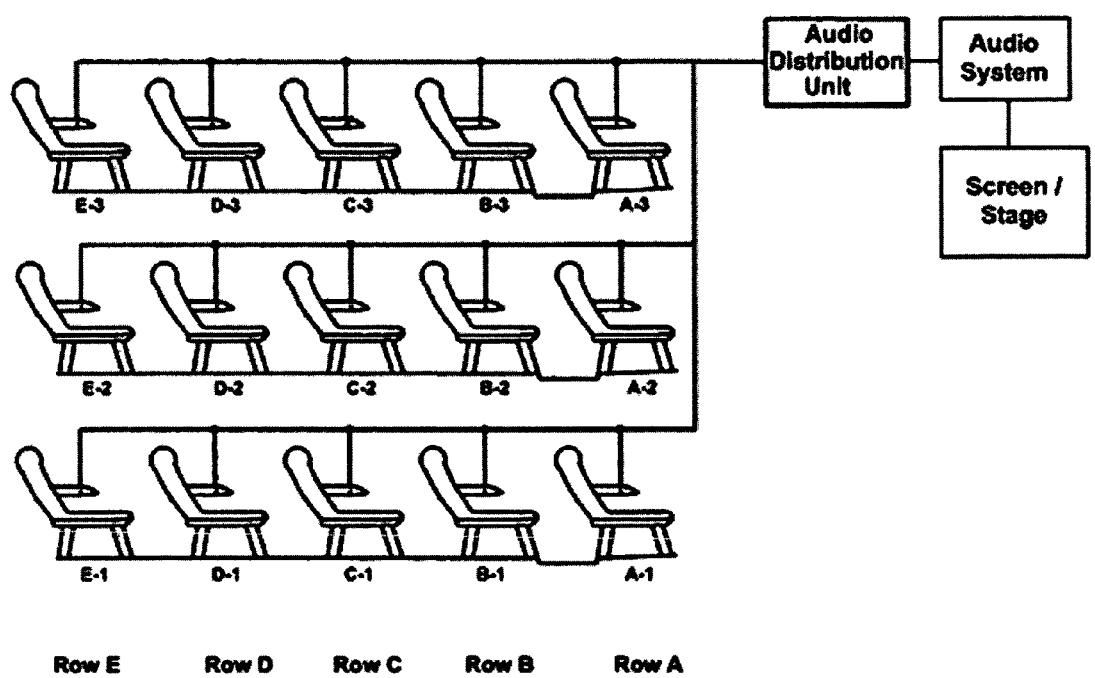
FIG. 2 is the typical architecture of theater/auditorium where user listens to the audible program which presented in foreign language.

The present invention allows a user to hear a program in his or her native language while watching the public events like indoor area for housing dramatic presentations, stage entertainments, surgical demonstrations or motion-picture, which is presented in a foreign language. The speech in the audible program is reproduced as an analog audio signal transferred on a physical cabling audio distribution network (shown in FIG. 2) in the theater/auditorium to each user's seat 10. Each user seat includes a "female" type connector 20 placed in the armrest. Generally, the analog audio signal is a stereo audio signal of an audible program is distributed to each user seat's armrest three-slot female connector 20. In FIG. 1.a, the phonetic language translation system (in dashed lines) of the present invention includes a "male" plug connector 102 that is inserted into the three-slot female connector 20 of user's seat armrest to make contact with the cabling audio distribution network of theater/auditorium to receive the analog audio output of an audible program which is presented to the user.

The one end of the male plug connector 102 has one terminal connected to provide a left audio signal $A_L$ and a second terminal connected to provide the right audio signal $A_R$. The three-slot female connector 20 of present invention has a terminal that is connected through the cabling audio distribution network of theater/auditorium to a power supply voltage source either integrated in or associated with phonetic language translation system (in dashed lines). The three-pin male connector 102 has a terminal that engages the terminal of the three-slot female connector 20 to conduct the power supply voltage $V_{PS}$ to the power conditioner. The power conditioner conditions the power supply voltage $V_{PS}$ to generate the voltage $V_{AA}$(not shown) to provide the necessary energy to power the system of present invention. Alternately, in connector structures, where there are no connections to the power supply voltage source $V_{PS}$, the power conditioner may be connected to a battery.

The phonetic language translation system of present invention receives the audio signal of a program presented to the user. The speech recognition module 104 is capable of receiving continuous speech information and converts the speech into machine recognizable phonemes. The speech recognition module 104 also includes a spectrum analyzer to remove background noise from the audio signal.

The phonetic language translation system of present invention discloses a translation module (shown in FIG. 1.a) which has parsing 106 and generation 108 module. The translation module is capable of interpreting the elliptical and ill-formed sentences that appear in audio output of the audible program. An interface is made between speech recognition module 104 and parser 106 in terms of phoneme hypothesis and word hypothesis levels, so that prediction made by the parser 106 can be immediately fed back to the speech recognition module 104. Thus, phoneme and word hypotheses given to the parser 106 consists of several competitive phoneme or word hypotheses each of which are assigned the probability of being correct. With this mechanism, the accuracy of recognition can be improved because it filters out false first choices of the speech recognition 104 and selects grammatically and semantically plausible second or third best hypotheses. The parser 106 is capable of handling multiple hypotheses in a parallel rather than a single word sequence as seen in machine translation systems. A generation module 108 is capable of generating appropriate sentences with correct articulation control. The phonetic language translation system of present invention employs a parallel marker-passing algorithm as the basic architecture. A parallel incremental generation scheme is employed, where a generation process and the parsing processing run almost concurrently. Thus, a part of the utterance is generated while parsing is in progress. Unlike most machine translation systems, where parsing and generation operate by different principles, this invention adopts common computation principles in both parsing and generation, and thus allows integration of these processes.

Various systems use different methods to extract the users' intentions from her/his brain electrical activity. The present invention discloses a new method to identify the native language of user by using these brain signals and translate the audio speech to identified native language. The present invention includes a signal processing module as shown in FIG. 1.a which has data acquisition module 110, signal preprocessing with online blind-source separation 112 to reduce artifacts and improve signal to noise ratio, a features extraction system 114 and classifiers i.e. pattern recognition 116.

In an exemplary embodiment, the first task of phonetic language translation system of the present invention is signal acquisition. The phonetic language translation system of present invention relies on measurements of brain language area activity signals collected via electrodes in the cap. As shown in FIG. 1.b, the electrode arrays 60 consists of sterile, disposable stainless steel, carbon tip electrodes each mounted on a cap 50 (as shown in FIG. 1.b) and closely joint with 66-pin male connector 80 for ease in positioning. These electrodes are transparent, flexible, numbered at each electrode contact and the standard spacing between electrodes is 1 cm. The electrodes of the cap 50 (as shown in FIG. 1.b) sit lightly on the language areas (Left, Right hemispheres and frontal lobes) of user's brain and are designed with enough flexibility to ensure that normal movements of the head do not cause injury to the user.

Figure 4:
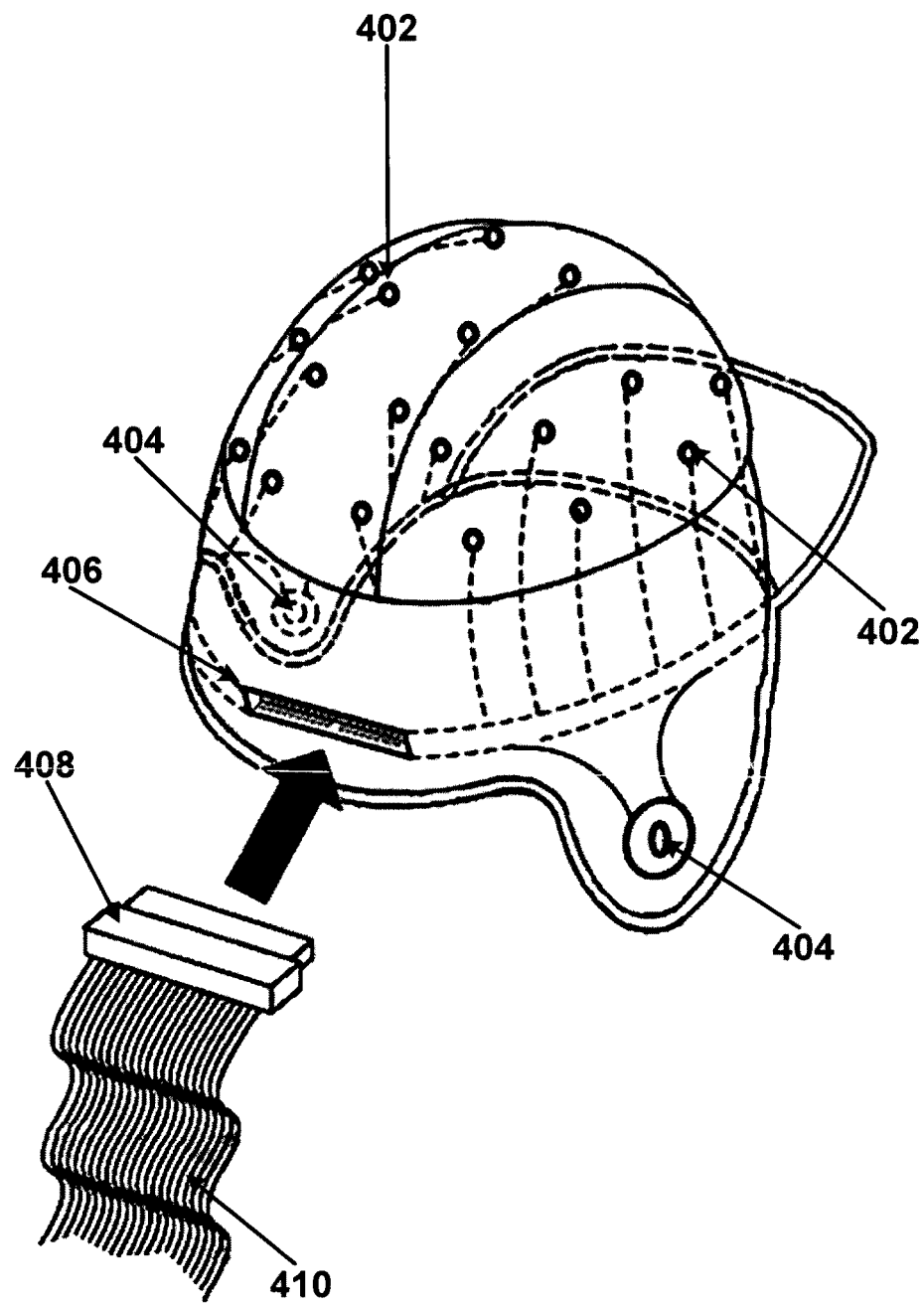
FIG. 4 is a side elevation of the cap showing the array of electrodes, earphones and 66-pin male connector and 66-slot female connector along with cable.

As shown in FIG. 4, the present invention uses the cap which has an array of miniature electrodes 402 and each electrode closely connected to 66-pin male connector 406 which is placed in the backside of cap. The 66-slot female connector 408 is inserted into the 66-pin male connector of cap to make contact with the electrodes and earphones. Other end of female connector connects to a data acquisition module 110 (as shown in FIG. 1.a) and voice synthesizer module 120 (as shown in FIG. 1.a). The acquired brain signals and voice synthesizer output audio signals are transferred through the 66-slot female connector cable 410. Also, the cap includes a headphone with two earphones 404 (left, right) that are closely connected to the 66-pin male connector 406. The voice synthesizer 120 (as shown in FIG. 1.a) output audio signals are delivered through female 408 and male 406 connectors to left and right earphones 404.

The second task of phonetic language translation system of the present invention is signal processing as shown in FIG. 1.a, which includes signal preprocessing online blind-source separation 112, features extraction system 114, pattern recognition 116. Language comprehension features are isolated from the brain language area activity signals and translated into machine readable code.

The third task of the present invention is native language identification 118. The native language identification module 118 uses an algorithm to determine the native language of user by comparing the recorded signals characteristics with "brain language area activity knowledge base;" (as shown in FIG. 1.a).

The "brain language area activity knowledge base" is an exhaustive, comprehensive, obsessively massive list of brain signal samples of language areas activity information; where the list of samples are collected information from experimental test results data of brain's language area activities and collected information from neurologists about brain's language areas comprehension. The "brain language area activity knowledge base" comprises of millions and millions of brain signals collected by recording the language area activity of the human brains. People from all cultures around the world are surveyed; while listening to the audible program in their native language, brain activity signals from the language area of their brain are recorded. These signals act as raw translations that indicate how the brain perceives the audible program in their native language. The recorded "brain language area activity signals" are then analyzed and the characteristics of the "brain language area activity signals" are stored in the "language area brain activity knowledge base" along with the name of corresponding native language.

For example, for building the "brain language area activity signal" sample for French language, a French audible program is presented to a person for whom French is the native language. During this experiment the electrodes are connected to the language areas (i.e., Left and Right hemispheres and frontal lobes) of his/her brain. While listening to a French audible program, his/her brain language area activity is being recorded. The recorded "brain language area activity signals" are then sent to a translator that uses special algorithms to decode the neural language to determine the characteristics of the French language. The test results along with name of the native language (i.e., French) information are being stored in the "brain language area activity knowledge base".

The "brain language area activity knowledge base" thus built contains a massive store house of characterizations of "brain language area activity signals" for over 6,700 native languages spoken across the world. This massive repository of language characteristics is later used by the present invention to identify the native language of the user.

Figure 3:
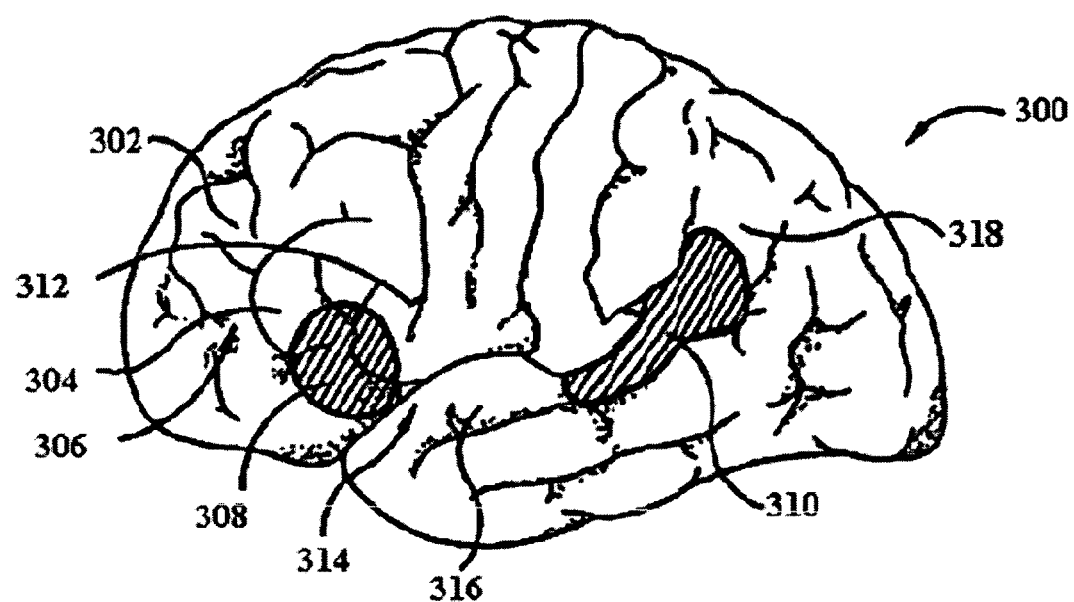
FIG. 3 is a partially schematic, isometric illustration of a human brain illustrating areas associated with language comprehension.

FIG. 3 is an isometric, left side view of the brain 300. The targeted language areas of the brain 300 can include Broca's area 308 and/or Wernicke's area 310. Sections of the brain 300 anterior to, posterior to, or between these areas can be targeted in addition to Broca's area 308 and Wernicke's area 310. For example, the targeted areas can include the middle frontal gyrus 302, the inferior frontal gyrus 304 and/or the inferior frontal lobe 306 anterior to Broca's area 308. The other areas targeted for stimulation can include the superior temporal lobe 314, the superior temporal gyrus 316, and/or the association fibers of the arcuate fasciculus 312, the inferior parietal lobe 318 and/or other structures, including the supramarginal gyrus, angular gyrus, retrosplenial cortex and/or the retrosplenial cuneus of the brain 300.

The first language area is called Wernicke's area 310. Wernicke's area 310 is an area in the posterior temporal lobe of the left hemisphere of the brain involved in the recognition of spoken words. Wernicke's area 310 one of the two parts of the cerebral cortex linked since the late nineteenth century to speech. It is traditionally considered to consist of the posterior section of the superior temporal gyrus in the dominant cerebral hemisphere (which is the left hemisphere in about 90% of people). The second language area within the left hemisphere is called Broca's area 308. The Broca's area 308 is an area located in the frontal lobe usually of the left cerebral hemisphere and associated with the motor control of speech. The Broca's area 308 doesn't just handle getting language out in a motor sense it is more generally involved in the ability to deal with grammar itself, at least the more complex aspects of grammar.

By analyzing data from numerous brain-imaging experiments, researchers have now distinguished three sub-areas within Wernicke's area 310. The first sub-area responds to spoken words (including the individual's own) and other sounds. The second sub-area responds only to words spoken by someone else but is also activated when the individual recalls a list of words. The third sub-area is more closely associated with producing speech than with perceiving it. All of these findings are still compatible, however, the general role of Wernicke's area 310, relates to the representation of phonetic sequences, regardless of whether the individual hears them, generates them, or recalls them from memory.

In operation, as illustrated in FIG. 1.a, three-pin male connector 102 is connectable to three-slot female connector 20 of user's seat 10 armrest in the auditorium/theater. While hearing the audible program users wear a cap 30 (as shown in FIG. 1.a) and the activity of language area of user's brain is being recorded using electrodes 50 (as shown in FIG. 1.a) in the cap 30. The recorded "brain language area activity signals" are decoded in signal processing module (as shown in FIG. 1.a) to identify the user's native language. The native language identification module 118 receives the decoded brain signals and runs a program routine to determine the native language of user, by comparing with "brain language area activity knowledge base". The native language identification module 118 program looks for the identical characterizations in the "brain language area activity knowledge base" for the decoded brain signals. If any data characterizations match with the decoded brain signals then the corresponding native language information is retrieved and fed into the generation module 108 for translation.

Simultaneously, the audio output of the broadcast program is transmitted through the three-pin male connector 102 to the speech recognition module 104. Speech recognition module 104 identifies the phoneme-level sequences from the audio output and builds the information content from best bet hypotheses of phoneme-level sequence using the parser module 106 and language dictionaries. The language dictionaries is a knowledge base which contains all possible word presented in more than 6,700 native languages being used in the world and provides lexical, phrase, syntactic fragment to generation module 108 while generating the equivalent sentence of native language of user for the audible speech from audio output. The language dictionaries are also operatively coupled to the parser 106 where speech recognition module 104 receives the feedback of phoneme hypothesis and word hypothesis prediction from the parser 106.

After determining the native language of speech in the audible program, the consecutively received phonemes are grouped to form consecutive words and these words are then combined into recognizable sentences in accordance with the grammatical rules of that native language. These recognizable sentences are then translated into an identified user's native language and each translated sentence is broadcast using voice synthesizer 120 to earphones 40 (as shown in FIG. 1.a) of the cap 30, so that the user's brain can comprehend the audible program in his/her native language.

Although the description above contains much specificity, these should not be construed as limiting the scope of the invention but as merely providing illustrations of some of the presently preferred embodiments of the invention. For example, the phonetic language translation system of the present invention could be utilized in any public event place where audible program is being broadcasted to each of user's native language. Such public event place could be, a theater, an auditorium, a flight, and such audible program could be, an indoor area for housing dramatic presentation, a stage entertainment, a surgical demonstration, in-flight entertainment, in-flight announcements or a motion-picture show having a sound track.

REFERENCES

"How the brain learns to read" By David A. Sousa
"Natural Language Generation in Artificial Intelligence and Computational Linguistics" By Cécile L. Paris, William R. Swartout, William C. Mann
"Artificial intelligence methods and applications" By Nikolaos G. Bourbakis
T. Morimoto et al., "Spoken Language Translation," Proc. Info Japan, Tokyo, 1990.
K. Kita, T. Kawabata, and H. Saito, "HMM Continuous Speech Recognition using Predictive LR Parsing," Proc. IEEE Int'l Conf. Acoustics, Speech, and Signal Processing, 1989.
"Natural language processing technologies in artificial intelligence" By Klaus K. Obermeier
"Advances in artificial intelligence: natural language and knowledge-based" By Martin Charles Golumbic
J. Vidal, "Toward Direct Brain-Computer Communication", in Annual Review of Biophysics and Bioengineering, L. J. Mullins, Ed., Annual Reviews, Inc., Palo Alto, Vol. 2, 1973, pp. 157-180.
J. Vidal, "Real-Time Detection of Brain Events in EEG", in IEEE Proceedings, May 1977, 65-5:633-641.
S. P. Levine, J. E. Huggins, S. L. BeMent, R. K. Kushwaha, L. A. Schuh, M. M. Rohde, E. A. Passaro, D. A. Ross, K. V. Elisevich, and B. J. Smith, "A direct brain interface based on event-related potentials," IEEE Trans Rehabil Eng, vol. 8, pp. 180-5, 2000
Artificial Neural Net Based Signal Processing for Interaction with Peripheral Nervous System. In: Proceedings of the 1st International IEEE EMBS Conference on Neural Engineering. pp. 134-137. Mar. 20-22, 2003.
U.S. Pat. No. 6,356,865, issued to Franz et al., entitled "Method and system for performing spoken language translation"
U.S. Pat. No. 7,392,079, issued to Donoghue et al., entitled "Neurological Signal decoding"
U.S. Pat. No. 7,574,357, issued to Jorgensen et al., entitled "Applications of sub-audible speech recognition based upon electromyographic signals"
U.S. Pat. No. 5,615,301, issued to Rivers et al., entitled "Automated Language Translation System"
U.S. Pat. No. 7,546,158, issued to Allison et al., entitled "Communication methods based on brain computer interfaces"
Miguel Nicolelis et al. (2001) Duke neurobiologist has developed system that allows monkeys to control robot arms via brain signals
Baum, Michele (2008=09-06). "Monkey Uses Brain Power to Feed Itself With Robotic Arm". Pitt Chronicle. http://www.chronicle.pitt.edu/?p=1478. Retrieved 2009-07-06.
Fetz E E 1969 Operant conditioning of cortical unit activity Science 163: 955-958

I claim:

1. A phonetic language translation system connectable to an audio output of an audible program presented to a user, said phonetic language translation system produce the meanings of words in the audible program to user where language area of brain of user can comprehend, said phonetic language translation system comprising:
an audio input connectable to an armrest connector of user's seat,
   wherein said audio input is an audio output of the audible program;
   wherein said armrest connector is a three-slot female connector which is a receptacle that connects to and holds the three-pin male connector;
the three-pin connector connectable to the said armrest connector of user's seat,
   wherein said three-pin connector is a male plug connector that is inserted into the three-slot female connector of seat armrest to make contact with the audio system of public event place to receive the analog audio output of an audible program,
   wherein said public event place is a room, fitted with tiers of seats rising like steps where user is located to hear and watch the audible program,
   wherein said seat comprises the said armrest three-slot connector which closely connected to the audio system of an audible program;
a speech recognition module operatively coupled to audio input for converting any speech within the audio output of the audible program into recognizable phonemes;
a parser module operatively coupled to speech recognition module in terms of phoneme hypothesis and word hypothesis levels, to provide feedback on prediction to the said speech recognition module;
a generation module operatively coupled to the said parser module for grouping the recognized phonemes into recognizable words and sentences in a native language so as to translate said recognizable sentences from native language directly into a native language of the user,
   wherein said native language is the language a human being learns from birth;
the language dictionaries containing all possible words and set of grammatical rules in all said native languages spoken in the world;
a voice synthesizer module connected to output of said generation module so as to broadcast audible speech which is the translation of said program in said user's native language and connectable to the earphones of cap through connectors;
the 66-slot female connector with cable closely coupled between the cap and data acquisition module, and voice synthesizer module, said 66-slot female connector carries "brain language area activity signals" from electrodes of cap to data acquisition module and delivers the translated speech audio signal to the earphones of cap via 66-pin male connector presented in the back-side of cap.

2. A phonetic language translation system of claim 1, further comprising:
a cap is close-fitting covering for the user's head with electrodes that have plurality of pins, less than the width of a human hair protruding from the inner lining of the said cap and penetrating the language areas to read the firings of plurality of neurons in the brain, said cap closely connected to voice synthesizer module and data acquisition module of said phonetic language translation system,
   wherein said the brain language areas are nerve cells in a human brain's Left hemisphere and Right hemisphere,
   wherein said Right hemisphere is the Wernicke's areas,
      wherein said Wernicke's areas are the regions in the posterior temporal lobe of the left hemisphere of the brain involved in the recognition of spoken words;
   wherein said Left hemisphere is the Broca's areas,
      wherein said Broca's areas are the regions located in the frontal lobe usually of the left cerebral hemisphere and associated with the motor control of speech,
said cap comprises:
an acquisition hardware for acquiring a "brain language areas activity signal" communicatively coupled to a said phonetic language translation system configured to analyze the "brain language areas activity signal" to help to determine said native language of the user,
   wherein said acquisition hardware is the array of electrodes for acquiring "brain language area activity signals" of user and each electrode closely connected to the 66-pin male connector,
      wherein said "brain language area activity signals" are signals collected from left hemisphere, right hemisphere and frontal lobes of user's brain and said "brain language areas activity signal" act as raw translations that indicate how the brain perceives the audible program in human beings said native language.

3. A phonetic language translation system according to claim 2, contains an output unit operatively coupled to a connector, to connect to a said 66-slot female connector, the output unit capable of outputting the translated audio speech to the user ears,
   wherein said connector is the 66-pin male connector plugged to a said 66-slot female connector integrated into data acquisition module and voice synthesizer of said phonetic language translation system;
   wherein said output unit is the headphones equipped with two earphones in the said cap, for listening to stereophonically reproduced sound for translated audio speech presented in the audible program,
      wherein said earphone held over the user's ear by a wire worn on the said cap and closely connected to the said 66-pin male connector.

4. A phonetic language translation system of claim 1, further comprising:
a signal processing operatively coupled between said cap and native language identification, said signal processing analyze the recorded said "brain language area activity signal" to identify the said native language of the user, said signal processing comprises:
a data acquisition module coupled to the electrode array for collecting and storing the said "brain language areas activity signal";
an online blind-source separation module to reduce artifacts and improvement signal to noise ratio;
a features extraction module to decode the said "brain language areas activity signal" and extract the language comprehension characteristics from said "brain language area activity signal".

5. A phonetic language translation system of claim 1, further comprising:
a native language identification module uses an algorithm to determine the said native language of user, said native language identification algorithm configured a program routine to determine the native language of user using "brain language area activity knowledge base",
   wherein said determine the said native language of user is the operation of program routine of said native language identification algorithm is look for the identical said "brain language area activity signal" data characteristics in "language area brain activity knowledge base" for decoded said "brain language area activity signal" data characteristics of user while he/she listening to the audible program, and selects the corresponding native language information when any data characteristics of said "brain language area activity signal" in the "language area brain activity knowledge base" matched with decoded said "brain language area activity signal" data characteristics of user.

6. A phonetic language translation system according to claim 4, wherein said "brain language area activity knowledge base" is an exhaustive, comprehensive, obsessively massive list of brain signal samples of language areas activity information,
wherein said list of brain signal samples are the collected information from experimental test results data of brain's language area activities and collected information from neurologists about brain's language areas comprehension.

7. A phonetic language translation system according to claim 6, a "brain language area activity knowledge base" comprises of massive store house of brain signals characterizations for all native languages spoken across the world, wherein said massive store house of brain signals are millions and millions of brain signals collected by recording the language area activity of the human brains,
wherein said recording the said language area activity of the human brains is the experiments with people from all cultures around the world and while listening to the audible program in their native language, brain activity signals from the said language area of their brain are recorded;
wherein said brain signals are act as raw translations that indicate how the brain perceives the audible program in human beings native language, the recorded said brain signals are then analyzed and the characteristics of the said brain signals are stored in the said "brain language area activity knowledge base" along with the equivalent native language name.

8. A method of translating an audio signal of an audible program from a said native language of the speech into an audible speech of a user's said native language, said method comprising the steps of:

identifying speech elements by generating a consecutive number of recognizable phonemes of the speech contained within the audio signal from an audible program;
forming consecutive words by grouping the consecutive number of recognizable phonemes into recognizable consecutive words;
identifying the said native language of the speech by identifying the said native language of the consecutive words formed in said step of forming consecutive words, the said native language of the consecutive words being the said native language of the speech;
forming consecutive sentences by grouping the recognizable consecutive words formed in said step of identifying the said native language, and forming said consecutive words into sentences in accordance with grammatical rules of the said native language of the speech identified;
identifying said native language of the user by recording said "brain language area activity signals" of user while listening to the audible program using the electrode arrays of said cap;
decoding the features of language comprehension characteristics from the recorded said "brain language area activity signals" by said signal processing;
selecting the identical said "brain language area activity signals" characteristics from said "brain language area activity knowledge base" by comparing recoded said "brain language area activity signals" characteristics with entries in said "brain language area activity knowledge base";
selecting the equivalent name of said native language information for matched entry of said "brain language area activity knowledge base" when identical said "brain language area activity signals" characteristics are matched with one of the entry in said "brain language area activity knowledge base";
translating into the said identified native language of a user, each consecutive sentence translated into the said native language of a user; and
broadcasting said each translated sentence with a said voice synthesizer and said earphones in the said cap to the user.

* * * * *